United States Patent [19]

Banks, Jr. et al.

[11] 4,054,186
[45] Oct. 18, 1977

[54] SNUBBER APPARATUS

[75] Inventors: Edwin L. Banks, Jr., Lakeview Terrace; Terrence P. Dowell, Van Nuys, both of Calif.

[73] Assignee: Barry Wright Corporation, Watertown, Mass.

[21] Appl. No.: 566,790

[22] Filed: Apr. 10, 1975

[51] Int. Cl.$^2$ .............................................. F16F 7/10
[52] U.S. Cl. ................................... 188/1 B; 188/184; 293/85
[58] Field of Search ............................ 293/85, 89, 70; 188/1 B, 180, 184, 135-136

[56] References Cited

U.S. PATENT DOCUMENTS

| | | | |
|---|---|---|---|
| 2,139,666 | 12/1938 | Bogart | 188/136 X |
| 2,856,179 | 10/1958 | Hogan | 267/9 |
| 3,059,727 | 10/1962 | Fuchs | 188/1 B |
| 3,390,742 | 7/1968 | Hrusch | 188/1 B |
| 3,718,326 | 2/1973 | Ristau | 293/89 X |
| 3,756,351 | 9/1973 | Sasaki | 188/1 B |
| 3,809,186 | 5/1974 | Suozzo | 188/1 B |
| 3,876,040 | 4/1975 | Yang | 188/1 B |
| Re. 27,327 | 4/1972 | Kalns | 188/135 X |

*Primary Examiner*—Robert B. Reeves
*Assistant Examiner*—Charles A. Marmon
*Attorney, Agent, or Firm*—Milton E. Gilbert

[57] ABSTRACT

A snubber apparatus which is constructed to present a high resistance to acceleration of the end fittings with respect to each other such as might occur due to seismic motion. The snubber apparatus preferably comprises a device which converts linear to rotary motion such as a ball screw and ball nut assembly which drives an inertia mass through a brake set and which when rotating causes braking to occur to increase the resistance force on the ball screw and ball nut assembly thus translating rotational resistance to linear resistance. The snubber apparatus is useful in restraining power plant piping, etc., in locations where earthquakes would be expected to occur.

13 Claims, 8 Drawing Figures

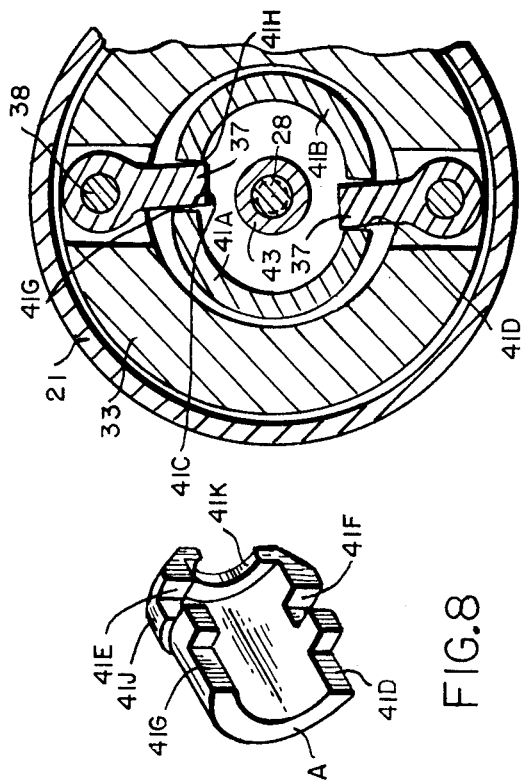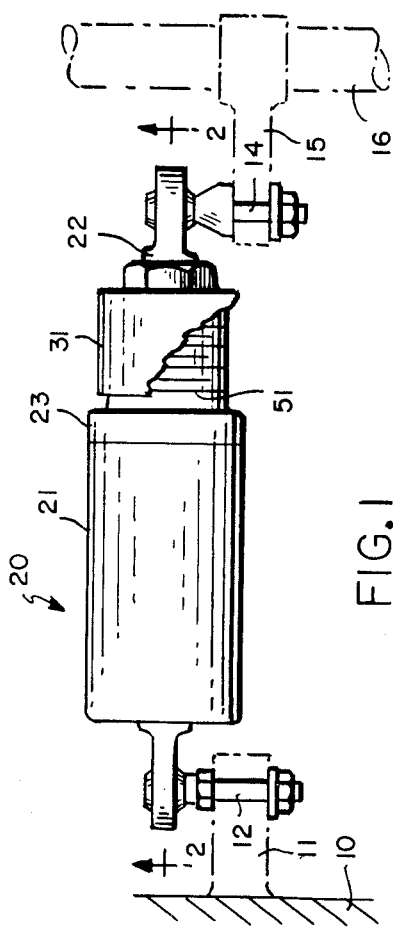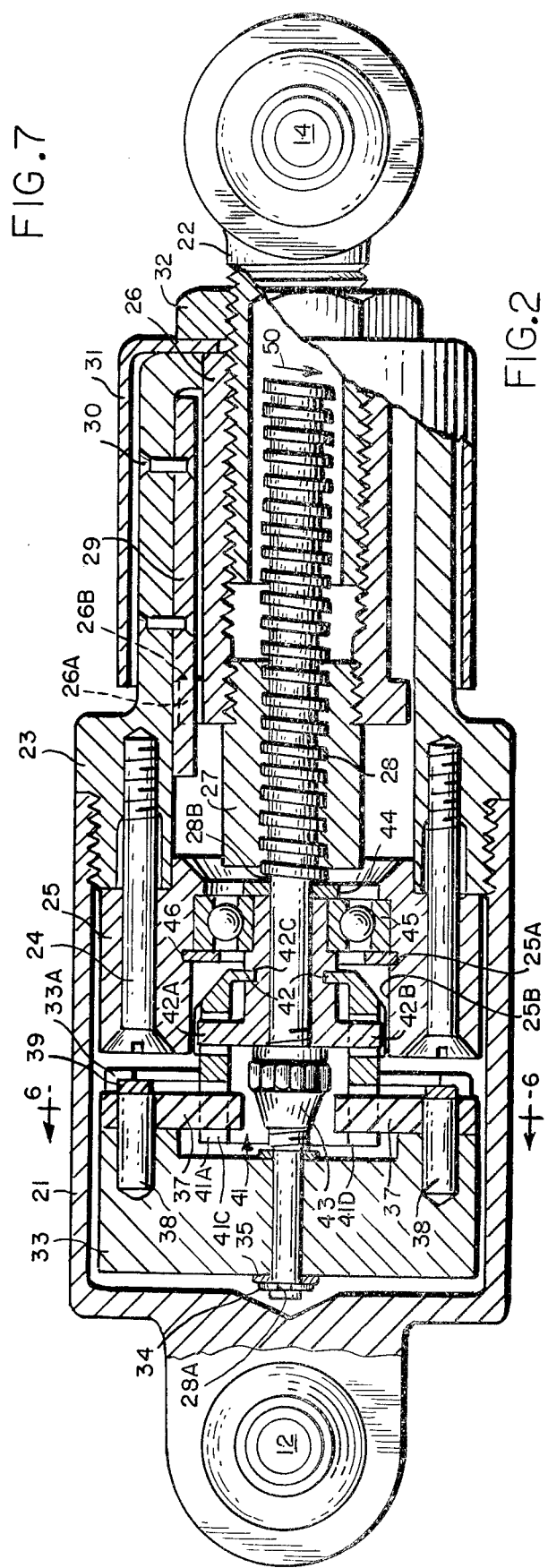

U.S. Patent  Oct. 18, 1977  Sheet 2 of 2  4,054,186
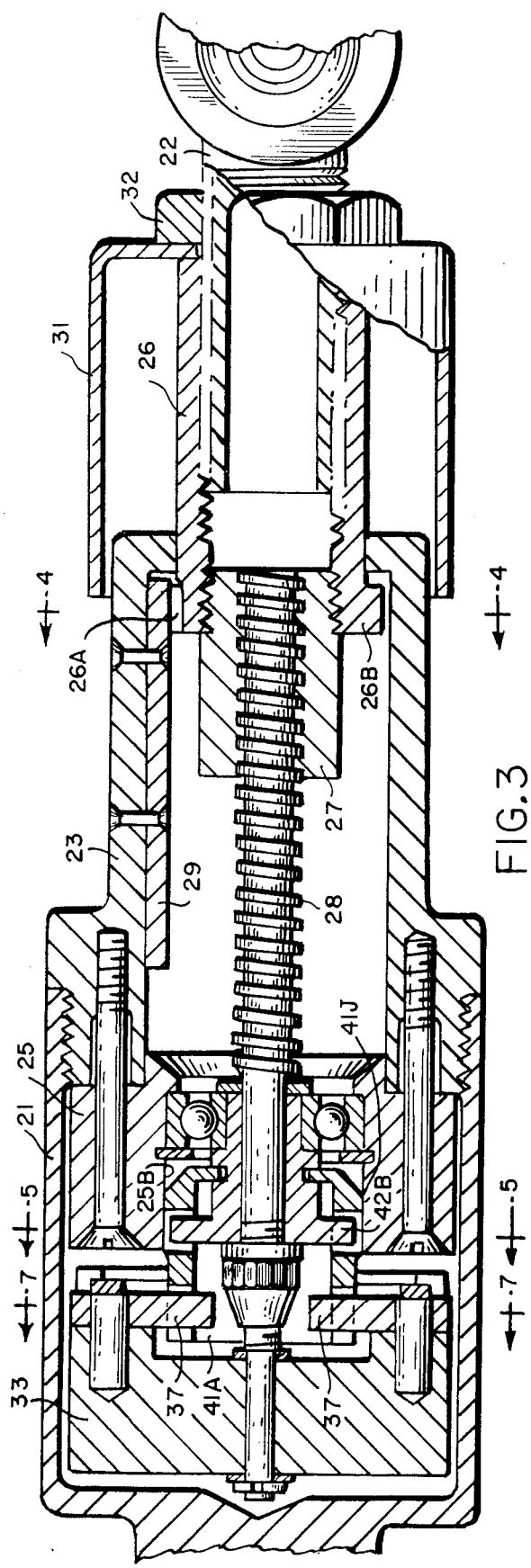

SNUBBER APPARATUS

BACKGROUND OF THE DISCLOSURE

This invention relates to snubbers or shock absorbers and, more particularly, to a mechanical device for restraining portions of a power plant to withstand earthquakes while at the same time providing freedom for movement of those devices which undergo thermal expansion or contraction during use.

In recent years the increased demand for electrical power and the reduced availability of oil has resulted in a demand for the increased use of nuclear power to generate electricity. While the feasibility of nuclear power plants is not questioned, their construction has posed certain questions as to the ability of equipment such as emergency cooling lines or pipes, heat exchangers, etc., to withstand earthquakes.

Current thinking would appear to call for the cooling lines or pipes, etc., to be rigidly coupled to building structures. While this would be simple enought to accomplish, the problem is more complicated than first meets the eye.

Cooling lines generally undergo thermal expansion ranging from inches to feet during thermal heat-up and cool-down cycles. Thus some means must be provided to support cooling lines and other devices which undergo thermal expansion in a manner such that movement during thermal cycles may be easily accomplished while at the same time providing protection under dynamic conditions such as an earthquake.

In the past, power plants have generally relied upon hydraulic dampers to restrain cooling pipes. However, hydraulic dampers have come into disfavor since they leak, they generally have sealing problems in radiation environments and they have a history of high maintenance costs.

Accordingly, a new and improved snubber or restraining apparatus was needed for use in supporting power plant devices which would be totally mechanical, would contain no hydrocarbon fluids, or hydro carbon material, could sustain high temperature or nuclear radiation environments and remain operational as well as provide protection from high seismic forces while permitting expansion due to thermal cycles.

The present invention provides such an apparatus which will meet the aforementioned requirements. In addition, the present invention provides an apparatus which may be constructed without requiring the use of springs.

BRIEF SUMMARY OF THE DISCLOSURE

The present invention provides a snubber or restraining assembly which provides little resistance to thermal expansion or contraction during heat-up or cool-down of power plant devices such as cooling lines while at the same time providing linear resistance to the motion of such power plant devices under dynamic conditions, i.e., conditions in which the power plant devices and the structure (building) begins to rapidly separate from each other or move towards each other e.g., an earthquake.

In the preferred embodiment of the snubber of this invention, there is provided means for rotating e.g., a ball screw or lead screw, means for causing rotation of said means for rotating e.g., a ball nut threadily coupled to said ball screw, and means responsive to rotation of said means for rotating to increase the resistance against rotation provided by said means for rotating with respect to said means for causing rotation under seismic conditions or relative acceleration of the end fittings.

In the preferred embodiment, resistance to angular acceleration is provided by a brake assembly coupled to an inertia mass which when abruptly rotated under dynamic conditions will cause the braking assembly to increase resistance to angular acceleration of said ball screw and thus translational or linear acceleration of the ball nut.

BRIEF DESCRIPTION OF THE DRAWINGS

FIG. 1 is a side elevation showing the snubber of the invention coupled between two structures;

FIG. 2 is a sectional view taken along line 2—2 in FIG. 1 illustrating the snubber in a fully retracted condition;

FIG. 3 is a sectional view similarly illustrating the snubber in an extended condition;

FIG. 4 is a sectional view taken along line 4—4 in FIG. 3;

FIG. 5 is a sectional view taken along line 5—5 in FIG. 3;

FIG. 6 is a sectional view taken along line 6—6 in FIG. 2;

FIG. 7 is a sectional view taken along line 7—7 in FIG. 3 illustrating the braking levers coupled to the inertia mass and urging the brake sections or shoes apart; and FIG. 8 is an isometric view of the left brake section or segment of the pair of brake shoes.

DETAILED DESCRIPTION OF THE DISCLOSURE

Reference should now be had to FIGS. 1–8 for a detailed description of the snubber or shock absorber of the invention. At 10 there is shown a building structure to which there is coupled a stationary bracket 11 in which a pin 12 is adapted to be supported.

The pin 12 is carried by the snubber 20 of the invention at one end thereof. The opposite end of the snubber is coupled by a pin 14 to a second stationary bracket 15 coupled or clamped to a structure e.g., a pipe or cooling line 16.

The snubber 20 comprises a first outer housing assembly 21 and a rod end assembly 22. Coupled to the first outer housing assembly 21 is a second outer housing assembly 23. Screws 24 are provided and secure a bearing housing 25 to said housing assembly 23. An internal housing or slide 26 is threadably coupled to the rod end 22 as well as to a ball screw nut 27 (Saginaw) which threadably engages a ball screw 28. The internal housing 26 is slideable from the retracted position in FIG. 2 to an extended position in FIG. 3 and is further adjustable with respect to rod end assembly 22 to a fully extended position (not shown). The slide is prevented from rotating by a key or guide 29 supported by rivets 30 which are positioned in a keyway 26A in collar 26B of the internal housing or slide 26.

A cover 31 is secured against the internal housing 26 by a nut 32 threadably coupled to the rod end 22. At 33 there is shown an inertia mass or wheel supported for free rotation on one end of the ball screw 28. The inertia mass 33 is prevented from sliding off the screw 28 by a snap-ring 34 which fits into groove 28A of the screw.

A washer 35 is positioned between the snap-ring 34 and the inertia mass 33. The inertia mass 33 supports a pair of brake levers 37 by pins 38. The pins 38 are retained in place by a snap-ring 39 which rests against a rear flange 33A of the inertia mass 33.

At 41 there is provided a brake set comprising two brake shoes or sections 41A and 41B. The levers 37 are positioned in open slots 41C and 41D for use between the brake sections. The brake sections also provide second slots 41E and 41F in which there are positioned arms 42A and 42B of a driver 42. The driver 42 is secured to the ball screw 28 for rotation therewith by a double hex-nut 43 threaded on the ball screw 28. To the rear of the driver is a washer 44 which engages a shoulder 28B of the ball screw 28.

The brake sections have an internal flange 41K which is positioned in a groove 42C of the driver. The driver 42 is supported as shown in a ball bearing assembly 45 and the bearing is locked within the bearing housing 25 by a snap-ring 46 which snaps into a groove 25A of the bearing housing 25.

The operation of the snubber apparatus of this invention is as follows: if for example, an earthquake causes acceleration of the building 10 away from the pipe 16, the slide 26 then begins to move to the right of FIG. 1.

This in turn pulls the ball nut 27 with it thus causing ball screw 28 to rotate as shown by the arrow 50. The acceleration of the ball screw 28 causes the driver 42 to rotate the brake sections or halves 41A and 41B which in turn through levers 37 accelerates the inertia mass 33.

A reaction force at the levers 37 acting at the edges 41G and 41H of the brake sections 41A and 41B respectively, is produced by the acceleration of the inertia mass 33. The levers 37 twist in the brake slots, 41C and 41D under this force, engaging alternately the inner and outer edges 41G and 41H of sections 41A and 41B, respectively, at slot 41C; and similarly at slot 41D, thereby contributing to the mechanical advantage of the levers 37.

The brake sections 41A and 41B are forced apart and the braking surface 41J is brought into contact with the inner surface 25B of the bearing housing 25. Additional mechanical advantage is obtained by the transmission of the braking force from surface 41J to react at groove 42C of driver 42.

Applying of the brakes increases the resistance of the ball screw to rotate in the ball nut and thus translates rotational resistance to linear resistance.

Upon reversal of the relative acceleration of the assemblies 21 and 22 caused by an earthquake, for example, the levers 37 reverse their positions in the slots 41C and 41D as a consequence of the reversed angular acceleration impressed on the inertia mass 33. The brake sections 41A and 41B once again contact braking surface 25B in the manner described above, to provide resistance to this acceleration. The resistance provided is proportional to the acceleration between the ends of the snubber 20.

As may be observed marks or rings 51 may be applied under the cover 31 on the member 23 to indicate the amount of extension of the snubber (as shown in FIG. 1).

It will thus be seen that a purely mechanical apparatus has been provided which is suitable for use in a high temperature or earthquake prone environment and which is acceleration sensitive while being attitude (position) insensitive. The apparatus may be constructed entirely of metal, does not lock up and needs no hydraulic fluid or springs for operation.

We claim:

1. A snubber comprising first and second members mounted for relative telescoping movement with respect to each other through a ball screw and ball nut, said ball nut threaded on said screw, said first member supporting said screw for rotation, said second member supporting said ball nut for telescoping motion with respect to said ball screw in order to cause rotation of said ball screw, a braking surface on said first member, an inertia mass frictionally driven by said ball screw and supported thereby for free rotation, a brake positioned adjacent said braking surface and having portions for engaging said braking surface, means coupled to said first member for supporting said brake, brake actuating lever means pivotally coupled to said inertia mass for moving apart said brake portions to bring said portions into engagement with said braking surface above a predetermined degree of acceleration of said members with respect to one another.

2. In the snubber according to claim 1 in which said brake actuating means comprises a pair of levers which urge said brake portions to move apart.

3. A snubber comprising a housing, a slide supported by said housing for relative telescoping linear motion, a ball nut supported by said slide for movement therewith, a ball screw coupled to said ball nut, said ball screw rotatably supported in a fixed position by said housing, a pair of brake sections positioned about a portion of said ball screw, a driver coupled to said ball screw for rotating said brake sections, an inertia mass supported for free rotation by said ball screw, and brake levers pivotally coupled to said inertia mass and engaging said brake sections, the pivoting of said levers urging said brake sections into braking engagement with a braking surface supported by said housing thereby retarding motion of said ball screw.

4. The snubber of claim 3 in which said housing supports a first coupling means and said slide supports a rod end assembly.

5. In a snubber, a first member and a second member coupled together for relative telescoping movement with respect to each other, a braking surface on one of said members, a ball nut supported by one of said members a ball screw coupled to said ball nut and supported by by a different one of said members than is supporting said ball nut, a driver secured to said screw for rotation therewith, an inertia mass supported by said screw for free rotation about said screw, at least one pin coupled to said inertia mass, at least one lever pivotally coupled to said pin coupled to said inertia mass, and brake shoes supported by said driver for motion towards and away from said braking surface, said driver rotating said brake shoes and said brake shoes engaging said lever, rapid acceleration of said members above a certain acceleration relative to one another causing said inertia mass to slip with respect to said screw and cause said lever to urge said brake shoes towards said braking surface.

6. In the snubber of claim 5 in which said braking surface is on said first member, said ball screw is supported for rotation by said first member and said ball nut is coupled to said second member for relative telescoping movement therewith.

7. In the snubber of claim 6 in which the lever slidably engage said brake shoes.

8. In a snubber, a pair of members mounted for relative telescoping movement with respect to each other through a nut and a screw, said nut supported by one of said members and said screw supported by the other of said members, said screw threadingly coupled to said nut, a braking surface on one of the said members, brake means supported by one of the members and having portions positioned for engaging said braking surface, an inertia mass frictionally driven by the screw, said inertia mass slipping with respect to said screw above a predetermined degree of acceleration of said screw, and brake actuating lever means pivotally coupled to said inertia mass for moving apart portions of said brake means to bring said portions into engagement with said braking surface upon lagging of said inertia mass with respect to said means for driving same.

9. In the snubber of claim 8 in which said brake actuating means comprises a pair of levers coupled for pivotal motion with respect to said inertia mass.

10. In a snubber, first and second members mounted for relative telescoping movement with respect to each other, a ball screw supported by one of said members, a ball nut supported by the other of said members, an inertia mass supported by said ball screw for free rotation with respect to said ball screw, a braking surface on one of said members, a driver coupled to said screw for rotation therewith, said driver supporting a pair of brake shoes for rotation therewith, each of said brake shoes having a surface for engaging the braking surface and a pair of ends, a pair of levers coupled to said inertia mass for pivotal motion, portions of each of said levers positioned between and against an end of each of said brake shoe, pivotal movement of said lever causing each brake shoe braking surface to engage said braking surface on said member.

11. In the snubber of claim 10 in which said lever portions in engagement with each said brake shoe end are slidable with respect to said shoe end and cause the ends of the adjacent brake shoes to move apart upon pivoting of said lever with respect to said inertia mass.

12. A snubber comprising a first and second member mounted for relative telescoping movement with respect to each other through a screw and nut, said screw threaded to said nut, said first member supporting said screw for rotation, said second member supporting said nut for telescoping motion with respect to said screw, telescoping motion of said nut causing rotation of said screw, a braking surface forming a portion of said first member, an inertia mass which rides on the screw but is not fixed to the screw, at least one pin coupled to said inertia mass for rotation therewith, a brake lever pivotally coupled to said pin, a driver coupled to said screw for rotation therewith, a brake supported by said driver adjacent to said screw and moveable away from said screw and into engagement with said braking surface, a constant velocity force relatively moving the first member with respect to said second member causing said inertia mass to rotate with said screw, acceleration of said first member with respect to said second member above a predetermined level, causing the screw to rotatably accelerate more rapidly then can be followed by the inertia mass whereby the lagging of the inertia mass with respect to the screw causes the pivotally coupled brake lever to urge the brake against the braking surface to thereby resist relative acceleration of said members above a predetermined level.

13. The snubber of claim 12 in which the brake comprises a plurality of brake sections which are urged apart by said lever.

* * * * *

UNITED STATES PATENT AND TRADEMARK OFFICE
CERTIFICATE OF CORRECTION

PATENT NO. : 4,054,186

DATED : October 18, 1977

INVENTOR(S) : Edwin L. Banks, Jr. et al

It is certified that error appears in the above-identified patent and that said Letters Patent are hereby corrected as shown below:

Column 1, line 21: Delete the word "enought" and substitute therefor the word "enough"

Column 4, line 43: Insert a comma (,) after "bers"

Column 4, line 44: Delete first use of the word "by"

Column 4, line 64: Delete the word "engage" and substitute therefor the word "engages"

Column 6, line 24: Delete word "then" and substitute therefor the word "than"

Signed and Sealed this

Twenty-first Day of February 1978

[SEAL]

Attest:

RUTH C. MASON
Attesting Officer

LUTRELLE F. PARKER
Acting Commissioner of Patents and Trademarks